United States Patent
Chand et al.

(10) Patent No.: US 9,817,391 B2
(45) Date of Patent: Nov. 14, 2017

(54) SECURITY SYSTEM FOR INDUSTRIAL CONTROL INFRASTRUCTURE

(71) Applicant: Rockwell Automation Technologies, Inc., Mayfield, OH (US)

(72) Inventors: Sujeet Chand, Brookfield, WI (US); David A. Vasko, Hartland, WI (US); Timothy Patrick Boppre, Jackson, WI (US); David A. Snyder, Waukesha, WI (US); Alex Laurence Nicoll, Brookfield, WI (US); Brian J. McMullen, Cedarburg, WI (US); Daniel B. Seger, Kenessaw, GA (US); John B. Dart, Nashotah, WI (US); Timothy F. Roback, Waukesha, WI (US); Paul G. Kucharski, Mukwonago, WI (US); Kevin Colloton, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 351 days.

(21) Appl. No.: 14/728,164

(22) Filed: Jun. 2, 2015

(65) Prior Publication Data

US 2016/0357176 A1    Dec. 8, 2016

(51) Int. Cl.
G05B 19/418    (2006.01)
H04L 29/06    (2006.01)
(Continued)

(52) U.S. Cl.
CPC ..... *G05B 19/4185* (2013.01); *G05B 19/0428* (2013.01); *G06F 21/57* (2013.01);
(Continued)

(58) Field of Classification Search
CPC ............ G05B 19/0428; G05B 19/4185; G05B 2219/23464; G05B 2219/33136;
(Continued)

(56) References Cited

U.S. PATENT DOCUMENTS

| 5,551,053 A | 8/1996 | Nadolski et al. |
| 5,867,382 A | 2/1999 | McLaughlin |

(Continued)

FOREIGN PATENT DOCUMENTS

| EP | 2672414 A1 | 12/2013 |
| EP | 2801942 A1 | 12/2014 |

(Continued)

OTHER PUBLICATIONS

Maryna Krotofil et al.; "Industrial control systems security: What is happening?," In 2013 11th IEEE International Conference on Industrial Informations (INDIN), pp. 670-675. IEEE, 2013. US.

(Continued)

*Primary Examiner* — Yuhui R Pan
(74) *Attorney, Agent, or Firm* — Boyle Fredrickson, SC

(57) ABSTRACT

An industrial control system providing security against tampering or modification generates periodic state thumbprints defining a state of control elements that may be forwarded to a security or safety appliance for comparison to a benchmark thumbprint indicating no tampering. The transmitted state thumbprint may capture not only programs but also configuration and environmental states of the control element.

19 Claims, 7 Drawing Sheets

(51) Int. Cl.
*H04L 9/32* (2006.01)
*G05B 19/042* (2006.01)
*G06F 21/57* (2013.01)

(52) U.S. Cl.
CPC ........ *H04L 9/3263* (2013.01); *H04L 63/0428* (2013.01); *G05B 2219/23464* (2013.01); *G05B 2219/33136* (2013.01); *G05B 2219/36542* (2013.01)

(58) Field of Classification Search
CPC .......... G05B 2219/36542; G06F 21/57; H04L 63/0428; H04L 9/3263
See application file for complete search history.

(56) References Cited

U.S. PATENT DOCUMENTS

| | | |
|---|---|---|
| 6,473,824 B1 | 10/2002 | Kreising et al. |
| 6,631,476 B1 | 10/2003 | Vandesteeg et al. |
| 6,701,198 B1 | 3/2004 | Vandesteeg et al. |
| 6,721,900 B1 | 4/2004 | Lenner et al. |
| 6,788,980 B1 | 9/2004 | Johnson |
| 6,891,850 B1 | 5/2005 | Vandesteeg et al. |
| 6,909,923 B2 | 6/2005 | Vasko et al. |
| 7,027,880 B2 | 4/2006 | Izzo et al. |
| 7,050,859 B1 | 5/2006 | Govindaraj et al. |
| 7,152,105 B2 | 12/2006 | McClure et al. |
| 7,308,385 B2 | 12/2007 | Wegerich et al. |
| 8,484,474 B2 | 7/2013 | Batke et al. |
| 8,516,239 B2 | 8/2013 | Masuda |
| 8,589,343 B2 | 11/2013 | Solin |
| 8,782,435 B1 | 7/2014 | Ghose |
| 9,094,385 B2 | 7/2015 | Akyol et al. |
| 9,224,096 B2 | 12/2015 | Oppenheimer |
| 9,357,381 B2 | 5/2016 | Cho et al. |
| 9,674,216 B2 | 6/2017 | Buber et al. |
| 2004/0162996 A1* | 8/2004 | Wallace .................. H04L 67/12 726/1 |
| 2006/0269104 A1 | 11/2006 | Ciolli |
| 2007/0162957 A1 | 7/2007 | Bartels |
| 2009/0193211 A1 | 7/2009 | Hu et al. |
| 2013/0212078 A1 | 8/2013 | Wilson |
| 2014/0039806 A1 | 2/2014 | Liao et al. |
| 2014/0203750 A1 | 7/2014 | Aufschneider et al. |
| 2014/0336795 A1 | 11/2014 | Asenjo |
| 2014/0337277 A1* | 11/2014 | Asenjo ............. G06F 17/30592 707/603 |
| 2015/0032229 A1* | 1/2015 | Ohno ................. G05B 19/0428 700/2 |

FOREIGN PATENT DOCUMENTS

| | | |
|---|---|---|
| EP | 2829931 A2 | 1/2015 |
| EP | 2980662 A1 | 2/2016 |
| WO | 2014144857 A2 | 9/2014 |

OTHER PUBLICATIONS

Extended European Search Report; EP Application No. 16170943.1.
F. Abdoli et al.; "Ontology-based distributed intrusion detection system." In Computer Conference, 2009, CSICC 2009. 14th International CSI, pp. 65-70. IEEE, 2009, US.
Salvador Mandujano; "An ontology-supported outbound intrusion detection system." In Proceedings of the 10th Conference on Artificial Intelligence and Applications, Taiwanese Association for Artificial Intelligence (TAAI 2005).; pp. 1-10; 2005. MX.
Franka Schuster et al. "A distributed intrusion detection system for industrial automation networks." In Proceedings of 2012 IEEE 17th International Conference on Emerging Technologies & Factory Automation (ETFA 2012), pp. 1-4. IEEE, 2012. US.

* cited by examiner

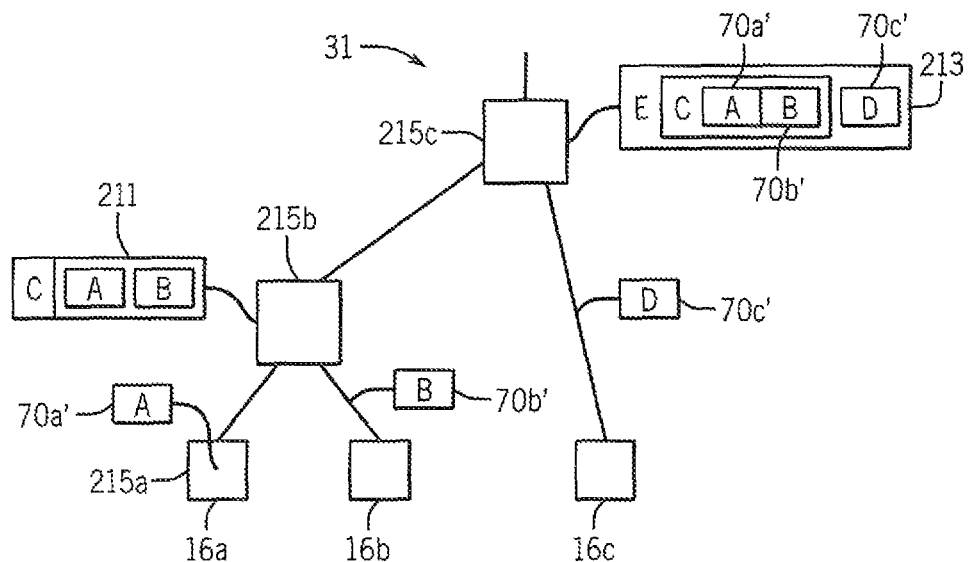
FIG. 10
| TAG 1 | FUNCTION | TAG 2 |
|---|---|---|
| — | — | — |
| — | — | — |
| — | — | — |
FIG. 11
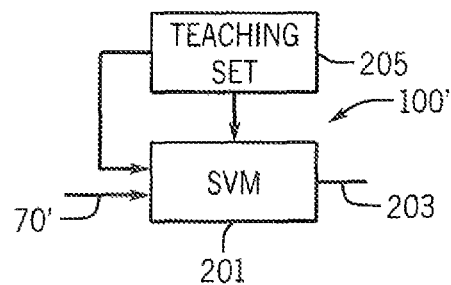
FIG. 12

SECURITY SYSTEM FOR INDUSTRIAL CONTROL INFRASTRUCTURE

STATEMENT REGARDING FEDERALLY SPONSORED RESEARCH OR DEVELOPMENT

CROSS REFERENCE TO RELATED APPLICATION

BACKGROUND OF THE INVENTION

The present invention relates to industrial controllers controlling factory automation and/or industrial processes and in particular to a system providing enhanced security for industrial control systems against malicious acts.

Industrial control systems have traditionally been protected against tampering or malicious activity by the same safeguards used to protect the physical equipment of the factory or the like, that is limiting physical access to the industrial controller and its associated equipment.

Modern industrial control systems employing distributed processing as well as network and Internet connections have greater exposure to attack. While such systems may be physically secured, more points of security must be established for distributed systems, and network connections to the Internet can render physical security irrelevant. Recent evidence is that access to industrial control systems through the Internet is being exploited by sophisticated and well-funded foreign nations or organizations. In one example, the United States Industrial Control System Cyber Emergency Response Team (ICS-CERT) has provided a warning related to malware (Black Energy) attacking the human machine interfaces (HMI) of programmable logic controllers used to manage and control industrial equipment. There is anecdotal evidence of successful Internet-based attacks directly on industrial control systems.

Unlike attacks on standard computer equipment and servers, attacks on industrial control systems can conceivably produce damage to physical property and risk to human life.

SUMMARY OF THE INVENTION

The present invention provides a system for increasing the security and/or safety of industrial control systems by generating a state thumbprint at each distributed component that may be encrypted and sent to a central monitoring appliance. The state thumbprint identifies not only tampering with the control program but also in configuration files and variations in environmental conditions that may be sensed by the distributed component.

Specifically, in one embodiment, the invention provides an industrial control device for use in an industrial control system providing coordinated control of multiple industrial control devices according to a control program. Each control device provides a housing holding a network port for communicating with other elements of the industrial control system and electrical connectors for accepting electrical conductors communicating with industrial equipment to receive or transmit electrical signals from or to that industrial equipment for the control of an industrial process. At least one processor communicates with the control system communication port and electrical connectors and with electronic memory holding: operating software describing operation of control device and executable by the processor, configuration data defining a configuration of the control device, and environmental data describing an operating environment of the control device, wherein the operating software, configuration data, and environmental data together define a control device state. The operating software executes to (1) read at least a portion of the control device state to generate a state thumbprint of the control device state as a digest reduced in size with respect to the portion of the state; (2) encrypt the state thumbprint; and (3) transmit the encrypted state thumbprint over the network port to the industrial control system.

It is thus a feature of at least one embodiment of the invention to provide a secure system that permits constant monitoring to detect tampering with the control system comprised of multiple distributed components without consuming excess bandwidth. The encrypted compressed state information can be communicated with minimal impact on the capacity of the control system communication mechanism.

The operating software may append at least one of a timestamp and sequence number to the state thumbprint, the timestamp and sequence number indicating, respectively, a time of transmission of the state thumbprint and a sequence of transmission of the state thumbprint over the network port.

It is thus a feature of at least one embodiment of the invention to prevent defeat of the monitoring system by the disabling of the interconnecting communication infrastructure or the capturing, modification, or addition of messages to the control system communication mechanism by a malicious party. The time of transition and sequence of transmission identify both network failure and intercepted messages.

The state thumbprint may provide a compressed representation of the operating software adapted to reveal tampering with the operating software when compared with a benchmark state thumbprint.

It is thus a feature of at least one embodiment of the invention to detect unauthorized modification of control device software which is readily susceptible to change in modern control devices.

The operating software may include a revision number.

It is thus a feature of at least one embodiment of the invention to detect tampering that may alter software version numbers, for example, to substitute less secure versions.

The operating software includes a control program and a monitoring program.

It is thus a feature of at least one embodiment of the invention to provide a monitoring not only of the control program of the device but of the monitoring program executed on the device itself.

The state thumbprint may provide a compressed representation of the configuration data of the control device.

It is thus a feature of at least one embodiment of the invention to capture tampering with an industrial control system that is reflected in changes in configuration variables such as the serial number of the control device, a functional type of the control device, a manufacturer of the control device and the date of manufacture of a control device.

The state thumbprint provides a compressed representation of the configuration data including an encrypted certification code indicating authenticity of the hardware.

It is thus a feature of at least one embodiment of the invention to provide a monitoring system that can detect counterfeit hardware.

The state thumbprint may alternatively or in addition provide a compressed representation of configuration data representing an output of a diagnostic program being part of the operating program.

It is thus a feature of at least one embodiment of the invention to provide a state thumbprint that is sensitive to tampering that might be detected by onboard diagnostic programs.

The state thumbprint may alternatively or in addition provide a compressed representation of the environmental data, for example, data indicating a connection or disconnection of conductors from the electrical connectors, broken wiring or stuck at faults.

It is thus a feature of at least one embodiment of the invention to detect disconnection of the control system from the controlled process.

Alternatively or in addition the environmental data may be data selected from the group consisting of a spatial location of the control device and a temperature of the control device.

It is thus a feature of at least one embodiment of the invention to enlist the control device to generally monitor its environment for indications of tampering that might not otherwise be evident.

The generation of the state thumbprint may read multiple portions of the control device state and independently compresses those portions using the compression system and concatenates the independently compressed portions to produce the state thumbprint.

It is thus a feature of at least one embodiment of the invention to provide a state thumbprint that at once indicates a global problem with the control device but that also allows pinpointing of the problem within the multiple components of the control device having separately compressed signature portions.

The operating software may respond to instructions received over the network port to change at least one of the number of the multiple portions and the particular portions of the control device state contained in the multiple portions according to those instructions.

It is thus a feature of at least one embodiment of the invention to affect the dynamic trade-off between the time it takes to transmit a state thumbprint and the information that can be derived from the state thumbprint. By changing the thumbprint qualities, an error indicated on a global thumbprint can cause the request of a finer resolution thumbprint to better discern the source of the problem.

The operating software may respond to instructions received over the network port to transmit the state thumbprint.

It is thus a feature of at least one embodiment of the invention to permit control of the timing of the transmission of state thumbprint by a central monitoring appliance to eliminate conflicts and bandwidth problems.

The control devices may be, for example, digital or analog I/O modules or a motor drive or the like.

It is thus a feature of at least one embodiment of the invention to provide a system that can be adapted to common control devices used in industrial control.

Some embodiments of the invention further contemplate a monitoring controller having a network port for communicating with control devices and at least one processor communicating with the network port and an electronic memory. The electronic memory may hold a monitoring program and at least one benchmark state thumbprint representing a state thumbprint of the properly operating control device identified to a control device and may operate to: (1) receive state thumbprints from a given control device through the network port and decrypt the state thumbprints; (2) identify a benchmark state thumbprint corresponding to the given control device; (3) compare the received state thumbprints to the corresponding benchmark state thumbprints; and (4) provide an output indicating whether the received state thumbprints match the benchmark state thumbprints.

It is thus a feature of at least one embodiment of the invention to provide a simple method of remotely assessing the global state of a distributed control system through a simple periodic comparison of state information from each of the components of the control system to a benchmark.

The monitoring program may further output an indication when a state thumbprint is not received within a predetermined time period.

It is thus a feature of at least one embodiment of the invention to provide a system that detects disruption or destruction as well as corruption of the components.

The monitoring program may transmit over the network port, to control devices, requests for state thumbprints at periodic request times and the time period may be based on a last periodic request time.

It is thus a feature of at least one embodiment of the invention to permit the disparate control devices to provide rudimentary monitoring of the operation of the monitoring appliance's expected retransmission.

These particular objects and advantages may apply to only some embodiments falling within the claims and thus do not define the scope of the invention.

BRIEF DESCRIPTION OF THE DRAWINGS

FIG. 10 is a logical representation of the hierarchy of the industrial control system of FIG. 1 showing the passing of context information upward through the hierarchy for the processing of dynamic thumbprint data;

FIG. 11 is a translation table for translating local variable names into the template variable names;

FIG. 12 is a process diagram the training of the supervised machine learning system for analyzing dynamic thumbprints;

DETAILED DESCRIPTION OF THE PREFERRED EMBODIMENT

Example Control System

Figure 1:
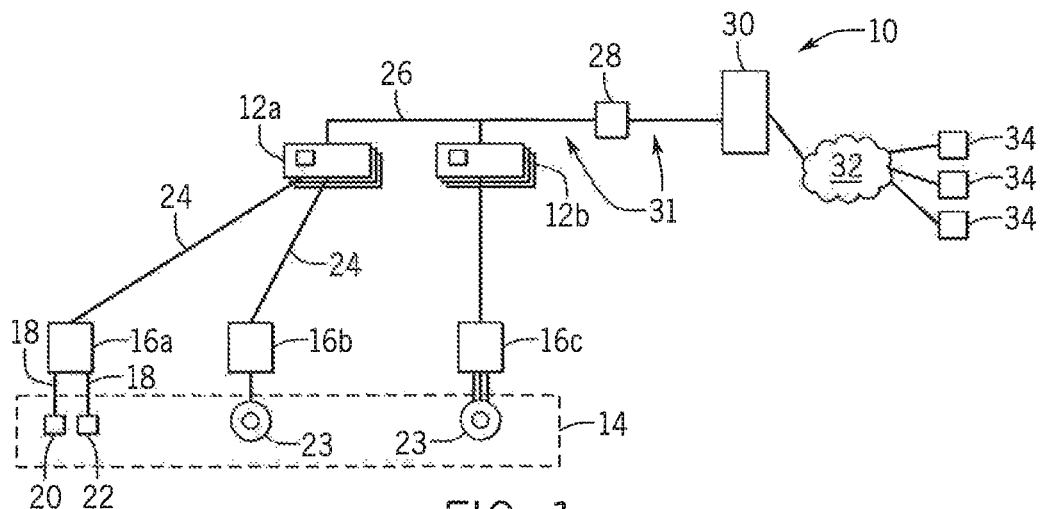
FIG. 1 is a simplified industrial control system showing multiple controllers, distributed control modules, connections to the Internet and supervisory systems suitable for use with the present invention.

Referring now to FIG. 1, an industrial control system 10 suitable for application of the present invention may provide one or more controllers 12a, 12b, operating to execute a control program for the control of an industrial process 14 as is generally understood in the art. The industrial process, for example, may coordinate a set of machines on an assembly line or the like, or interact with actuators and sensors of plant processing materials to control that process, or conduct other similar control applications.

The industrial controllers 12 may communicate downstream with one or more control devices 16a-16c providing a direct interface to the elements of the industrial process 14. Such control devices 16 may include, by way of non-limiting example, one or more I/O modules 16a providing input and output lines 18 to and from the industrial process 14 allowing communication with sensors 20 and actuators 22. Other example control devices 16 may be a motor controller 16h controlling power applied to electric motor 23, or motor drives 16c providing more sophisticated motor control, for example, by synthesizing power waveforms to a motor 23.

The industrial controllers 12 may communicate with the control devices 16 by means of an industrial control network 24 such as the Common Industrial Protocol (CIP™), EtherNet/IP™, DeviceNet™, CompoNet™, and ControlNet™ managed by the standards organization, ODVA, of Michigan, USA. Such networks provide for high reliability transmission of data in real time and may provide features ensuring timely delivery, for example, by pre-scheduling communication resources such as network bandwidth, network buffers, and the like.

The industrial controller 12 may also communicate upstream, through a data network 26 (which may, but need not be an industrial control network) via one or more routers or switches 28, with a central computer system 30. This latter supervisory computer system 30 may further communicate via the Internet 32 with remote devices 34 such as computer terminals, mobile wireless devices, and the like. Alternatively, there may be a direct connection between the industrial controller 12 and the Internet 32.

As is generally understood in the art, each of the control devices 16, industrial controllers 12, switches 28, computer systems 30 and remote devices 34 may provide one or more electronic processors and associated electronic memory holding programs executable by the processors, some of which are described below.

Figure 2:
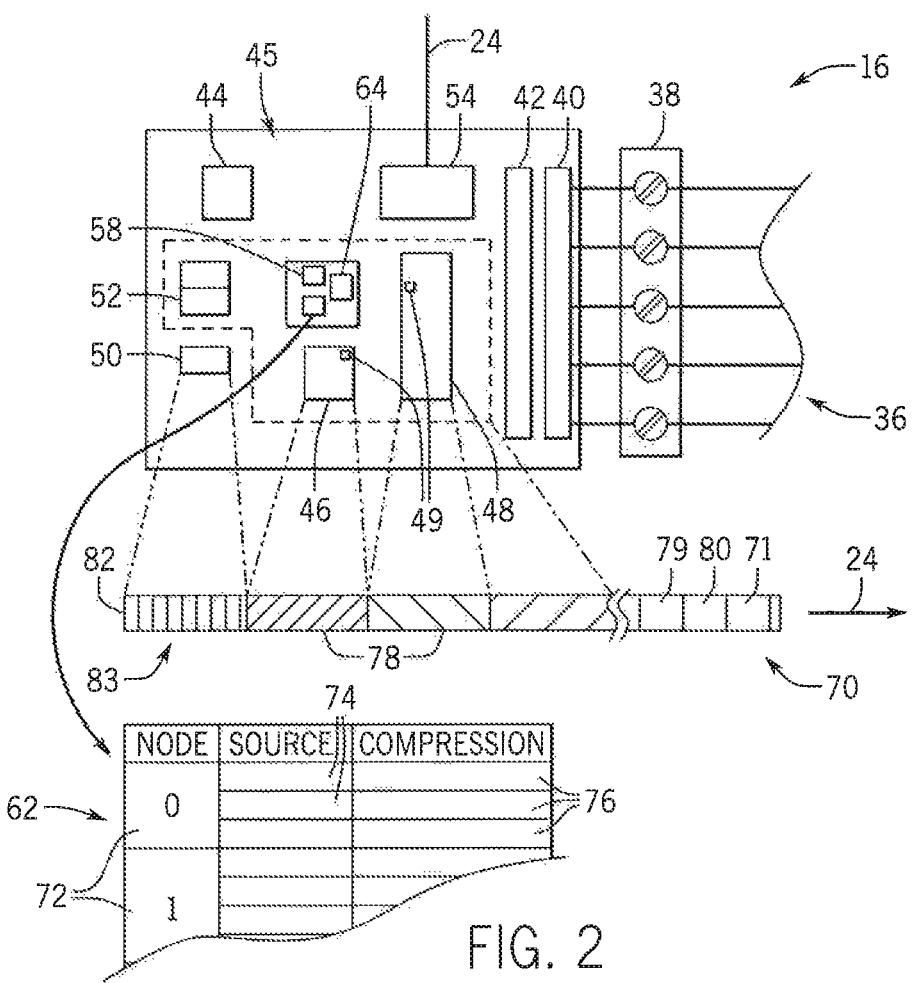
FIG. 2 is a functional diagram of an example control devices showing various functional components whose data may be incorporated into a thumbprint revealing the security state of those components.

Referring now to FIGS. 1 and 2, a representative control device 16 provides for I/O conductors 36, for example, wires communicating with sensors 20, actuators 22, motors 23, or the like. These I/O conductors 36 may be releasably connected to the control device 16 via one or more terminal or connector systems 38, for example, screw terminals. The connector system 38 in turn may communicate with a connection management circuit 40 which can detect, for example, the presence or absence of a conductor 36 attached to the connector system 38, for example, by monitoring a current loop or by monitoring an applied voltage or the like, or a broken wire or "stuck at" fault by monitoring and absence of signal state change over a predetermined time period or during application of a test signal.

Signals from the conductors 36 pass through the connector system 38 and connection management circuit 40 and are acquired and stored in an I/O table 42 being part of onboard computer memory 45 comprised of volatile and nonvolatile memory structures. Signals to be output from the control device 16 may be also stored in the I/O table 42 prior to transmission on the conductors 36.

A processor 44 within the control device 16 may execute a control program 46, for example, held in volatile memory, as mediated by operating system 48, for example, being firmware held in nonvolatile memory. The control program 46 may process inputs received from conductors 36 as stored in I/O table 42. These inputs may be transmitted to an industrial controller 12 via a network interface 54 allowing communication on the network 24 for processing by a control program held in the industrial controller 12. The control program 46 and the operating system 48 may be implemented as either firmware or software or a combination of both.

Conversely, the control program 46 of the control device 16 may also execute to receive outputs from the industrial controller 12 through the network interface 54 to generate output values written to the I/O table 42 and ultimately output over conductors 36. The control program 46 may also or alternatively execute some control logic to generate its own outputs from received inputs.

In one embodiment of the present invention, the control device 16 also holds in memory 45 a security program 58 that provides for generating a "thumbprint" according to a thumbprint table 62 and a defense script 64, both of which will be discussed further below.

Static Signatures

The control device 16 may employ a variety of data structures that reflect the status of the control device, its configuration, and the authenticity of its programs.

The control program 46 and the operating system 48 may include information such as a revision number and digital signature 49, for example, the latter using public-key or similar techniques such as asymmetric encryption and cryptographically secure hash functions, that allow determination that the associated firmware or software is from a trusted or valid source.

Generally, the revision number need not be a single revision number, but could include an aggregated set of revision numbers representing a set of different revision numbers, for example, from different components of the software or from affiliated software or a chain of sequential revisions. Revision numbers may also be associated with firmware or hardware of the device, as will be discussed below.

In addition, the entire data set of the control program 46 and the operating system 48 may be hashed or otherwise digested to a reduced size sub-thumbprint as will be described below. This digesting process is strictly distinguishable from compression in that the latter anticipates a de-compression or recovery step, but as used herein this digesting process will generally be referred to both as a digesting and/or a compression with this distinction understood.

A hardware configuration register 50 (implemented in volatile or nonvolatile memory 45 and/or as physical switch positions) may hold settings for controlling the operation of the control device 16 and may additionally provide manufacturing data about the control device 16 including, for example, a serial number, module function type, manufacturer name, manufacture date, and the like. In addition, the hardware configuration register may provide for a read-only memory including an encrypted certification code embedded by the manufacturer indicating authenticity of the hardware. The hardware configuration registers may further provide a storage location for output data from one or more diagnostic programs implemented by the operating system 48, for example, those that indicate memory or other faults, instruction execution speed, memory capacity or checksum results. In one embodiment, the diagnostic program outputs CPU utilization, free memory, and stack depth. The diagnostic program may also monitor network communication including port traffic over a predetermined interval and/or change in average port traffic such as may indicate a denial of service type attack.

A transaction log 52 also held in memory 45 may record certain activities affecting the control device 16, for example, the act of uploading of new control program 46 and/or operating system 48 or changes in switch settings stored in the hardware registers 50, and may record these activities and the time at which they occurred in the source of the change, for example, including identity of an authorized individual.

Referring still to FIG. 2, during operation of the control device 16, under the control of the security program 58, a digital operating thumbprint 70 may be periodically generated and transmitted to a security device 31, for example, one of the industrial controllers 12 or the computer system 30. This operating thumbprint 70 ideally captures portions of the data structure described above that can be used to determine whether they have been tampered with or corrupted in some fashion. For maximum flexibility, the contents of the digital operating thumbprint 70 may vary according to a thumbprint table 62 which provides for various transmission modes 72 each associated with different digital thumbprints 70 having different amounts of information and thus representing different degrees of size reduction of the state data of the control device 16. As such, these different digital operating thumbprints 70 provide a trade-off between thumbprint detail and computational and transmission burden.

Generally, the operating thumbprint 70 for each mode 72 of the thumbprint table 62 designates a specific set of thumbprint source data 74, for example, the control program 46, the firmware operating system 48, the configuration register 50, and environmental data held in various components of the control device 16 including the wire connection states of the connection management circuit 40, its address and/or location in the factory environment (for example held in communication or memory modules), operating temperature and the like from distributed internal sensors. In one example mode 72, the entire data set from each of the sources is reduced to a digest, for example, using a cyclic redundancy code or hash compression and these compressed representations are assembled to generate one or more digital operating thumbprint 70. The compression process may be loss-less or lossy but need not allow reconstruction of the digested data.

This digital operating thumbprint 70 is then transmitted to the remote security-monitoring device where it is compared with a corresponding stored thumbprint to establish within a reasonable probability according to the digest scheme that the source data 74 of the control device 16 has not been modified or tampered with.

In different modes 72, the amount of data size reduction provided in the thumbprint table 62 may be reduced or each of the source data 74 compressed separately so that an analysis of the operating thumbprint 70 may reveal the particular source data 74 that has changed or been corrupted. Thus, for example, each of the control program 46 and operating system 48 may be separately compressed into a sub-thumbprint 78. Mismatches in the comparison of the sub-thumbprint 78 and its corresponding copy at the security device 31 allow for determination of which of the structures of a control program 46 and operating system 48 have changed as opposed to their being simply a change in one of the two programs. The importance of this will be explained below with respect to determining the significance of any mismatch in the thumbprints. Similarly, the wire-off information of the connection management circuit 40 and hardware registers 50 may be transmitted without compression (e.g., as uncompressed sub-thumbprints 78) so any detected change in the sub-thumbprint 78 immediately indicates which wire has been disconnected or which hardware value has changed.

The operating thumbprint 70 may also include digital signature 82, allowing the detection of tampering of the operating thumbprint 70 after it has been transmitted from the control device 16. In this respect the operating thumbprint 70 may include a timestamp 79, a sequence value or randomly generated value 83 that may be synchronously developed at a receiving security device 31 (for example, by a clock or similar algorithm) so that an operating thumbprint 70 may not be intercepted and replaced to spoof the security device 31 into believing that an operating thumbprint 70 has been sent or different operating thumbprint 70 has been sent. The timestamp 79 and the sequence value or randomly generated value 83 encoded in the operating thumbprint 70 prevents ready substitution of values in an intercepted operating thumbprint 70. The operating thumbprint 70 may also include a device identification number 71 that allows the particular control device 16 sourcing the thumbprint to be positively determined.

The operating thumbprint 70 has been described only with respect to control devices 16, but it will be understood that every element of the control system 10 may develop these thumbprints which may be passed upward to a security device 31. Thus the controllers 12 may also generate thumbprints when the security device 31 is computer system 30. The exact content and compression of the thumbprint 70 will be device-specific.

Figure 3:
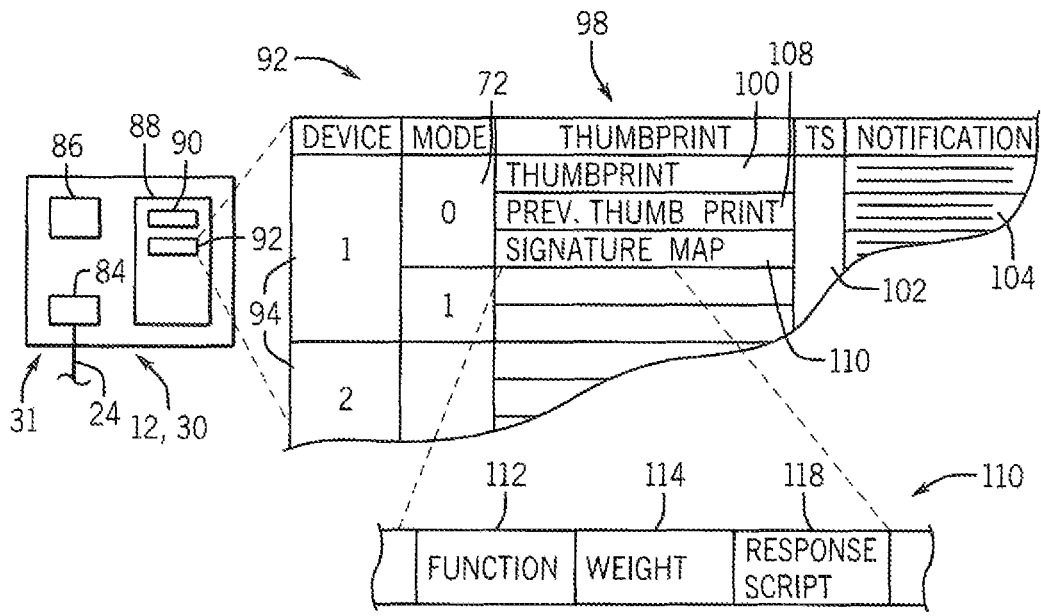
FIG. 3 is a functional diagram of a security device and a security template used in managing the security signatures generated by the control devices.

Referring now to FIG. 3, the security device 31 managing the analysis of the operating thumbprints 70 will generally include a network interface card 84 communicating with the network 24 to receive the operating thumbprint 70 on a periodic basis, for example, as pushed from the control devices 16 or in response to a poll from the security device 31. In one embodiment, the polling from the security device 31 is done on a periodic basis, for example, timed from the last transmitted message from the control device 16. In this way, the control devices 16 may also assess the health or security of the system if necessary when a polling has not been performed after a predetermined time. The polling may be done by employing authentication certificate using a public-key encryption or the like to prevent spoofing of this polling process.

Generally, the security device 31 also includes a processor system 86 and a memory 88 holding a security-processing program 90, as will be described, and a populated security table 92 used for security analysis.

The populated security table 92 may provide an entry for each control device 16 as indicated by entry field 94. The populated security table 92 may also provide, for each signature mode 72, thumbprint data 98 including a stored thumbprint 100 for that signature mode 72, previous valid thumbprints 108, and a thumbprint map 110. A timestamp value 102 may be stored in the security table 92 or an associated data structure to indicate the received time of the latest copy of a valid operating thumbprint 70 from a given control device 16, and a notification tree 104 may be provided which provides contact information for notifications of security issues as will be discussed below.

The thumbprint map 110 may generally identify each of the sub-thumbprints 78 by the function 112 of the source data 74 (for example: operating system 48, control program 46, hardware registers 50) and will give a weight 114 indicating the significance of a possible mismatch between stored thumbprint 100 and received thumbprints 70 or sub-thumbprint 78. The thumbprint map 110 may also provide a response script 118 indicating possible responses to a detected mismatch between the operating thumbprint 70 and the stored thumbprint 100. Clearly the number of sub-thumbprints 78 and hence the number of thumbprint maps 110 will vary depending on the particular mode 72.

Figure 4:
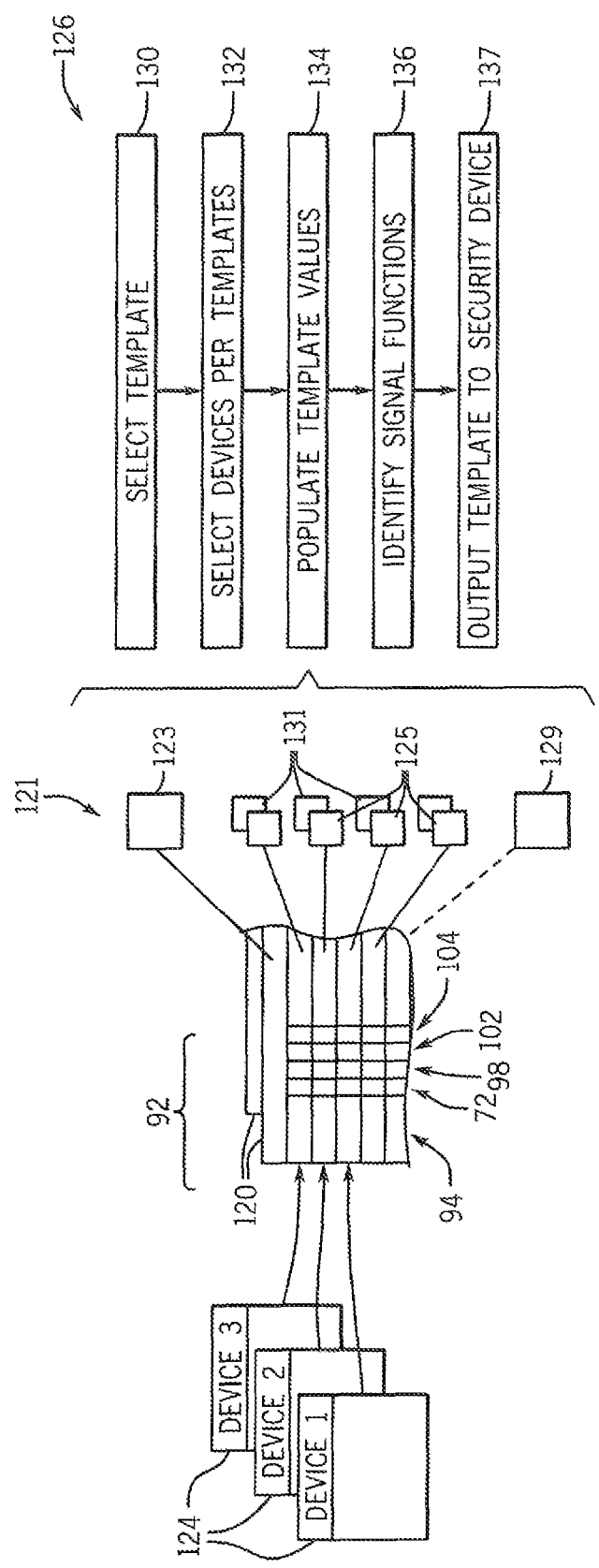
FIG. 4 is a flowchart depicting the steps of populating the security template of FIG. 3 from various device files.

Referring now to FIG. 4, the information of the populated security table 92 may be rapidly generated by selecting from a number of standard security templates 120 being generally defined for different generic types of control systems 10. For example, a given packaging line providing for relatively standard control devices 16 may provide a standardized template 120.

Each template 120 may provide for generic programs 121 for each of the components of the industrial control system 10 including a generic control program 123 for one or more controllers 12 and generic device programs 125 and security programs 131 for one or more associated control devices 16. The generic programs 121 will define generic I/O points that allow for electrical communication to sensors or actuators of an industrial process 14 using generic names. As will be discussed below, these generic I/O points may be modified by the user to link them to actual physical I/O in a configured industrial control system. Afterwards the modified generic control program 123 and modified device programs 125 may be loaded into the associated physical components to provide for a rapidly configured security system.

The standardized template 120 may also be associated with a security-monitoring program 129 that may be uploaded into the supervisory computer system 30 (shown in FIG. 1) for communicating with the security programs 131 to coordinate the security process.

Once a standardized template 120 is selected, the generation of a populated template may be performed by a template crafting program 126 executed, for example, on the computer system 30 or a controller 12 during the commissioning of the control system 10 as indicated by process block 130. Each standardized template 120 will have pre-populated elements based on the assumed underlying process, and will also require additional information for the particular industrial process 14. For example, some of the pre-populated elements may identify general functional blocks needed for the control system 10 of the type assumed by the template 120. The user may then select among specific device files 124 representing a particular control device 16, for example, a given model number of motor controller that meets a functional block requirement (e.g., generic motor controller) of the standardized template 120 but provides specifics with respect to the particular device. Incorporation of device files 124 into the standardized template 120 is indicated by process block 132. In some embodiments, the specific device files 124 may provide their own versions or modifications or patches to the generic device programs 125 or security programs 131. Generally hardware manufacturers may supply the necessary device files 124.

Standardized template 120 will also include the elements of the security table 92 as discussed above which may be used by the security-monitoring program 129. Generic elements of the security table 92 may be supplemented by data manually added or edited by the user within the framework provided, for example, to create the notification tree 104, indicating people to be notified in the event of the thumbprint mismatch. Some pre-populated elements, for example, weights 114 that are ascribed to a particular control device 16 or sub-thumbprint 78, may be modified or may assume a default value from the standardized template 120. These editing changes are indicated by process block 134.

Referring to FIGS. 4 and 11, as noted above, in order for the pre-established security templates 120 to provide for rules that work not only with the generic process of the security template 120 but also with an actual control process, the process of populating the template values per process block 134 may employ a template translation table 208 which links standardized template device names 220 for generic control devices to actual device names 218 for the actual control devices 16 of the industrial control system 10. This linking may be performed at a time of commissioning per process block 136 guided by corresponding functions 217 describing the functions of the generic control devices associated with the standardized device names 220. The standardized template device names 220 built into predefined rules associated with the security templates 120, as described below, may then be mapped to the actual device names 218 so that the predefined security roles of the security templates 120 may apply to the devices of the particular application without the need to develop the rules for each different application.

Also at process block 136, particular generic functions implemented by various input or output variables maybe identified by particular tag names used in a given control program 46, for example, so that the security device 31 may interpret the function implemented by a particular conductor 36 should it become disconnected from connector system 38, so that a generated report to a user can indicate the function that was lost not simply an arbitrary wire number. The standardized security templates 120 allow the benefits of a detailed vulnerability analysis of the given types of control systems, identifying likely failures, the significance of those failures and the response to those failures indicated by mismatch thumbprints 70, to be leveraged among many installations and many users. When the standardized template 120 is fully populated at process block 137, it may be uploaded to the security device 31 and the security-processing program 90 activated.

Figure 5:
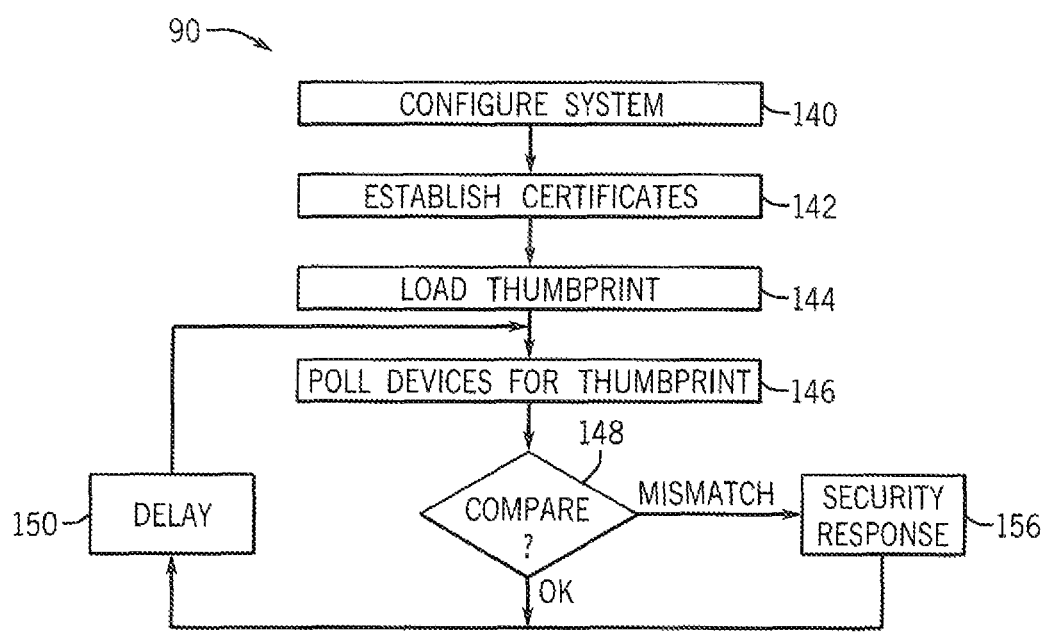
FIG. 5 is a flow chart of a configuration tool executed by the controller of FIG. 3 or other security device in configuring a security system of the present invention and the operation of a security-processing program.

Referring now to FIG. 5, before the industrial control system 10 is put into use, the control system 10 may be configured, as indicated by process block 140, during which the various components may be interconnected by the network 24 and the necessary control program 46 loaded into control devices 16 and hardware register values 50 and other components initialized in the loaded populated security table 92 installed.

At process block 142 public keys or similar security keys such as asymmetric encryption may be created and distributed to the components of the industrial control system 10 (e.g., the control devices 16, the controllers 12, etc.) to allow for the attachment of digital signatures in the exchange data described above with respect to the thumbprints 70. At process block 144, the populated device templates 120 generated for the security device 31 are loaded with stored thumbprint 100 of each of the components of the system 10.

During general operation of the control system 10, thumbprints 70 are solicited from or pushed by the control device 16 to the security device 31, as indicated by process block 146, where they are compared as indicated by decision block 148 with the stored thumbprint 100 for the proper mode 72. This comparison is according to the particular control device 16 from which the operating thumbprint 70 is received. If the operating thumbprint 70 matches the stored thumbprint 100, then after a delay indicated by process block 150 this process is repeated so that any potential tampering or failure of the control devices 16 may be identified in near real-time. In the event that there is a mismatch between the received thumbprints 70 and the corresponding stored thumbprint 100 in the populated security table 92, then the security-processing program 90, at decision block 148, proceeds to process block 154 and one of a number of different responses from response script 118 may be implemented. This detection may be in real time or may occur on a regularly or randomly scheduled basis.

It is contemplated that the stored thumbprints 100 may also be subject to periodic comparison to other stored values, for example their values at an earlier time, as held in a second storage location to detect possible tampering with the stored thumbprint 100. That is, a tracking of the history of the security thumbprints 100 may be performed and any mismatch detected in this tracking may also invoke a response according to process block 154.

Figure 6:
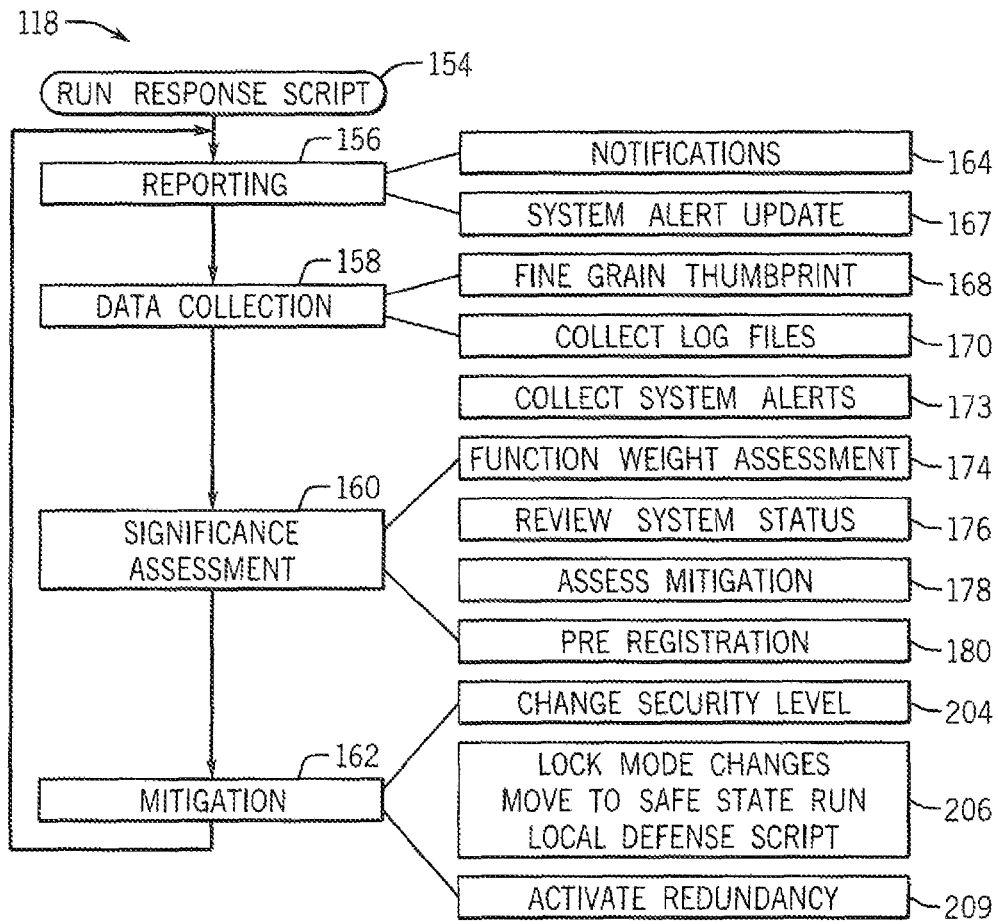
FIG. 6 is a flowchart of the steps executed by the security-processing program after configuration in executing a response script.

Referring now to FIG. 6, in the event of a mismatch at decision block 148, the security-processing program 90 will generally implement the response script 118 that may be stored in the populated security table 92. This response script 118 may perform a number of different tasks including: generating notification reports per process block 156, performing additional data collection per process block 158, assessing a significance of the mismatch at process block 160, and taking mitigating or defensive actions at process block 162. Each particular step is optional and whether it will be performed is determined by the particular response script 118. Each of the process blocks 156-162 may be repeated in a loop so that the response and analysis constantly evolves with additional information and possibly other changes in the system.

Figure 8:
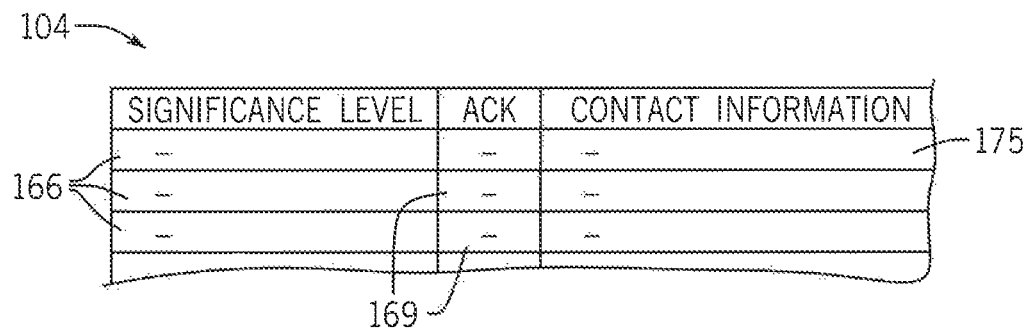
FIG. 8 is a logical representation of the notification tree providing different notifications depending on their significance levels and responses from notified individuals.

The reporting of process block 156 may provide for notifications to individuals or groups in a notification tree 104 of FIG. 3 per process block 164. Referring momentarily to FIG. 8, in one embodiment, notification tree 104 may provide multiple entries each associated with a significance level 166 of the mismatch. Each significance level is linked to an acknowledgment level 169 and contact information 175. The acknowledgment level 169 may indicate whether a contact individual has acknowledged receipt of that contact. Generally, the contact information 175 may be a network address, a human machine interface, and e-mail address, a mobile device contact number, or any of a variety of different methods of communicating a problem to individuals or groups of individuals and/or other devices including controllers 12 or factory indicators such as lights and beacons.

Figure 14:
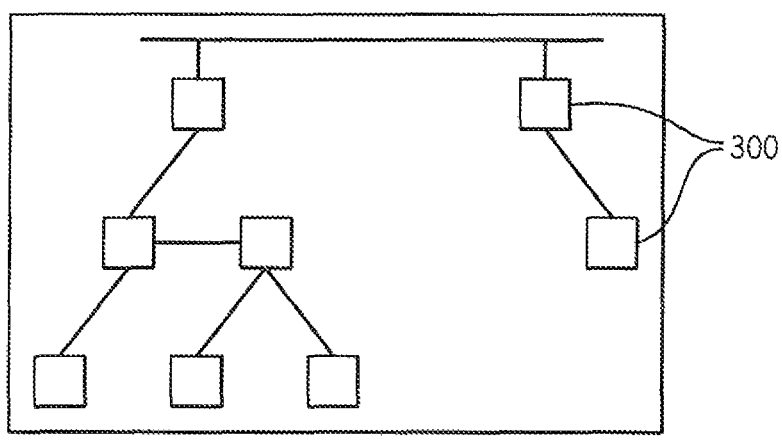
FIG. 14 is a simplified depiction of a global display of security status.

The notifications, when to individuals, may be, for example, via e-mail messages or served as a web page and may provide, for example, a graphical display (shown in FIG. 14) that indicates each of the functional elements 300 of the industrial control system 10 and its status with respect to errors in thumbprints 70, severity of errors, the timing or sequence of errors, and mitigating actions, for example, by color. This information may also be displayed locally on a human machine interface or the like to provide an immediate snapshot of system security in the vicinity of the controlled equipment.

For a first mismatch, at a first iteration of the loop of process blocks 156-162, the significance level 166 will be zero because significance has not yet been determined at process block 160. The context for this low significance level may be limited to individuals in charge of routine maintenance or the like or simply to a log file. For example, minor mismatches in thumbprints or sub-thumbprints may be reported only to technical individuals in charge of maintaining the system and may be indicated to be low priority whereas more significant mismatches may provide reports with urgent designations to fast responders and supervisors. As additional mismatches occur and as the loop is executed multiple times, the significance level 166 may rise and the particular contact information 175 identifying individuals to be contacted will change according to the significance of the mismatch and whether or not one or more parties has responded or acknowledged receipt of the notification. In one response script 118 if no parties acknowledge receipt of the notification in a given period of time, the significance level 166 will rise so that additional contacts may be added or different people may be notified pending on the severity of the potential problem as will be discussed below.

The reporting of process block 156 may also provide a system alert update being a globally available system security value that may be read by other security devices 31 to allow coordinated effort. This system alert update, indicated by process block 167 may provide information about the mismatch, including any detailed information of the mismatch components, it significance level 166 and possible additional steps being taken. As will be discussed below, the system alert status from other security devices 31 or generated by other control devices 16 in different response script 118 may also be considered with respect to setting the significance level 166 of a particular mismatch. By understanding multiple disparate mismatches, a more nuanced view of the significance of the local mismatch can be determined.

At data collection process block 158, additional data may be collected with respect to the mismatch signature typically driven by the significance level 166 but also driven by the type of mismatch. Most notably a finer-grained operating thumbprint 70 may be obtained (e.g., more sub-thumbprints 78), as indicated by process block 168, based on identification of the coarse operating thumbprint 70. Thus, for example, if the operating thumbprint 70 has very low granularity indicating only a mismatch in data of a collective group of data structures, the fine-grained data collection of process block 168 will provide for a more partitioned sub-thumbprint 78 so that the location of the particular mismatch may be better identified, for example, to a particular data structure or device. This escalation of the detail provided by the thumbprint allows a trade-off between knowledge about the specific problem and network overhead necessary to communicate the thumbprints to be flexibly set.

At process block 170 of data collection process block 158, transaction logs 52 may be collected to prevent loss or damage of those transaction logs 52 and to allow analysis of the transaction logs 52 such as may indicate a source of the error (for example, a given human operator making changes to the system). The transaction logs 52 may also inform possible mitigating steps, as will be discussed below, for example, locking out certain personnel from changing the software of the control devices 16. At process block 173, system significance level 166 may be read in order to gain an understanding of all possible control devices 16 experiencing signature mismatches (that have uploaded system alerts at process blocks 167) and to adjust the data collection level.

The invention contemplates that some response scripts will operate in a "stealth" mode in which data is collected and possibly stored for a long period of time on activities that do not justify alarms or other notifications. This stealth mode satisfies the trade-off between avoiding frequent false alarms and notifications, while ensuring that long-term trends and minor deviations are nevertheless fully assessed and treated. Minor changes in system security may be automatically implemented in the stealth mode as well, of types provided by the discussed response scripts, but without necessary notifications.

The data collected during the stealth mode may be separately analyzed, for example, over a longer time period so that a long-term, lower level of alert may eventually be escalated to a higher level simply because of the long-term nature of the detected anomaly, or because of additional information that can be evaluated from long-term data collection. For example, long-term trends or correlations (e.g., security issues associated with the particular individual's access to the equipment or in another pattern) can then be aggregated and reported or used to trigger higher level responses.

The assessment of the significance of the mismatch is determined at process block 160 and allows tailoring of any response to mismatches in the thumbprints 70 to a derived severity. By assigning severity levels to any mismatch, false alarms may be reduced while rapidly escalating response, even for minor mismatches, when the type of mismatches indicates possible tampering or interference with operation of the control system 10. Generally, the significance level 166 will derive from a number of factors that may be investigated at process block 160. For example, at process block 174, the location of the mismatch (for example, to a particular component of the control device 16) may be used to obtain a weight 114 described above indicating the abstract significance of the error. Thus for example, a disconnection of a wire conductor 36 providing information from a redundant sensor or to a actuator not critical for operation of the industrial control system 10 may have a low weight whereas substantial errors in the control program 46 or operating system 48 may be given higher weight.

At process block 176, the change in the system status (for example, derived from system alert update of process block 167 for multiple control devices 16) may be analyzed to see if the particular mismatch is part of a pattern of mismatches throughout the control system 10 and to analyze any trending of those mismatches so that mismatches that are part of a rising number of mismatches are given greater weight. The weight may be affected by the number of mismatches or the number of different structures exhibiting mismatches. Analysis of patterns of mismatches among different separated control devices 16 may be incorporated into the response script to identify particular changes that may individually look benign but together suggest more significance and a higher significance level 166.

At process block 178, mitigation options are assessed to see if particular mismatches may be easily mitigated, for example, using redundant control devices 16 or using backup information that may be put into place by command from the security device 31. If the mismatch may be mitigated, lower significance level 166 may be assigned.

At process block 180, the mismatches in current thumbprints 70 and stored thumbprint 100 are compared against any scheduled changes that have been preregistered with the security device 31, for example, in a calendar-type application. The significance of mismatches that relate to changes that have been preregistered is generally assigned to a lower significance level 166. Similarly unscheduled changes that occur while the control device 16 is in a configuration or maintenance mode (as set from the control panel of the control device 16) may be registered as less severe than when the same configuration changes are detected during runtime. In this way false positives may be reduced.

Figure 7:
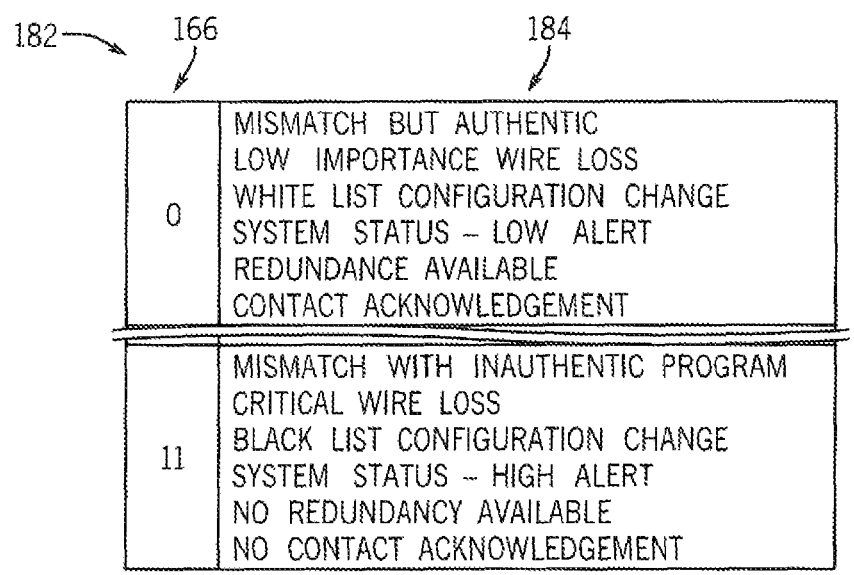
FIG. 7 is a logical representation of the significance matrix for analyzing the significance of detected errors.

Referring now also to FIG. 7, process block 160 of assessing the significance level 166 of a mismatch of current thumbprints 70 and stored thumbprint 100 may be implemented by simply summing the weights 114 of the thumbprint map 110 associated with each mismatch. Alternatively a calculation of significance level 166 may be implemented by a set of rules that provides for more sophisticated Boolean combinations of weights and other factors. Most generally, a significance matrix 182 may be developed to map multiple conditions 184 to particular significance levels 166. Thus, for example, low significance (e.g., 0) may be mapped to conditions such as mismatched control program 46 that is nevertheless indicated to be authentic or occurring during a scheduled maintenance upgrades or a sub-thumbprint 78 that matches a previous thumbprint 108. Similarly, a wire loss indicated to be on a low importance function may gamer a low significance level 166. A white list may be established indicating, for example, changes or change combinations that are generally benign, for example, expected patterns of changes in the hardware registers 50 may be mapped to low significance level 166. Changes that occur during a low alert status of the system may be given a low significance level 166. A low alert status may result from no or low numbers of mismatches or mismatches having low significance levels 166 at different control devices 16 or that occur on hardware that is redundant and thus can be readily mitigated, or when the occurrence of the mismatch has been acknowledgment by the contact individual with an indication that a high significance is not warranted or should be overridden. In addition, particular input or output points identified to be important or leading indicators of a critical failure (or indicative of proper operations) may be received as inputs for the purpose of establishing an importance of other errors.

Conversely mismatches caused by inauthentic control programs 46 or operating systems 48, that also match no previous thumbprint 108, that occur during unscheduled times, or that are caused by wire-off signals for critical functions may be given a high significance. Just as a white list may be established, a blacklist of configuration changes that are suspected, or have been predetermined to suggest tampering, may create a high significance level 166. Changes that are individually benign or low significant but where the changes occur during in an environment of other high significance levels 166 or changes associated with a predetermined pattern of mismatches in other similar control devices 16 may also be promoted to a high significance level 166. Clearly cases where there is no redundant hardware available and no response from individuals contacted as part of the reporting process block 156 may be given greater significance.

Figure 13:
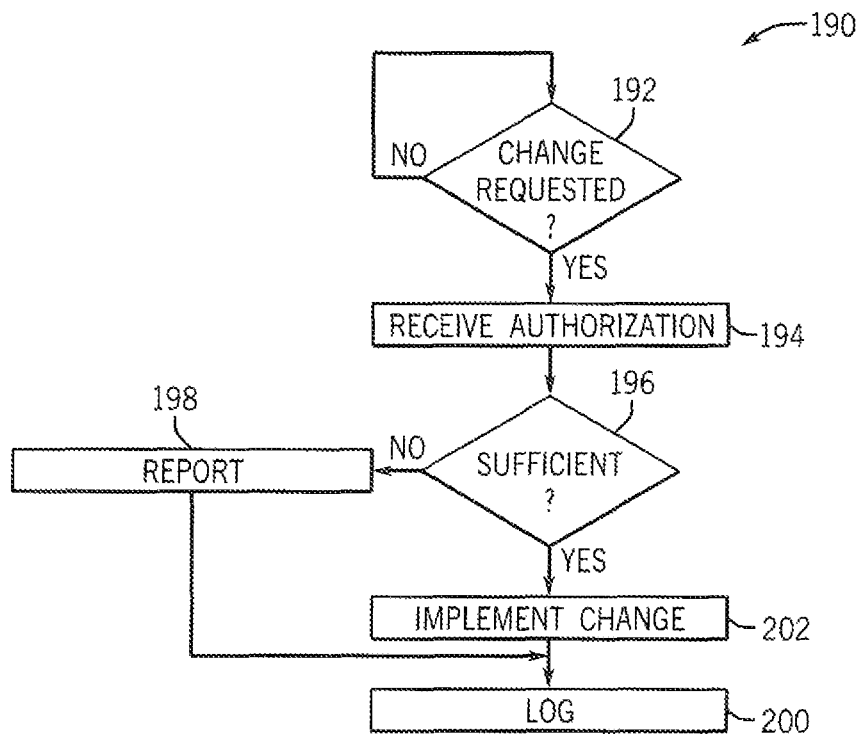
FIG. 13 is a flowchart of an authorization protocol used to prevent unauthorized changes in the control hardware.

Referring momentarily to FIG. 13, each or any one of the control devices 16 and controllers 12 may implement in firmware or software of the operating system 48 a change supervisor 190 that requires certain steps in order for the industrial controller 12 or control device 16 to be modified. These steps may be implemented on the control device 16 itself or on a proxy device designated as the gateway for such changes. The change supervisor 190 may monitor any request for a change in any of the components subject to the thumbprints 70 (e.g., the control program 46, the firmware operating system 48, and the configuration register 50) at decision block 192. When a change is requested, an authorization may be requested of the individual seeking to make the change as indicated by process block 194. This authorization may be a password or a multifactor authorization, for example, requiring password information and a physical key or the like. Ideally the authorization identifies a specific responsible individual.

The received authorization may be compared against a list of authorized individuals and/or individual clearances at decision block 196. If the authorization level is not sufficient as determined by decision block 196, a report may be generated as indicated by process block 198 and this attempt recorded in the transaction log 52 as indicated by process block 200. Otherwise the change may be implemented as indicated by process block 202 and again the change recorded in the logging process of process block 200.

The assessment of the significance level 166 of the mismatch determined at process block 160 is used to generate the reports at process block 156, potentially suppressing broad dissemination of reports for minor matters while escalating reports for matters of higher significance level 166 as has been discussed. The significance level 166 of the mismatch may also drive the mitigation actions according to process block 162 as the process blocks 156-162 are looped through.

Referring now to FIG. 6, the process block 162 performing a mitigating action in the event of a mismatch between the received thumbprints 70 and a stored thumbprint 100 may modify the change supervisor 190 as one possible mitigating action shown by process block 204. Specifically, in the event of a mismatch, process block 204 may change or increase security levels needed for particular operations. For example, security levels for changes in the control program 46 or operating system 48 may be increased particularly in a situation where it appears that widescale tampering may be occurring. Particular individuals identified from the transaction logs 52 associated with a mismatch, as collected at process block 170, may have their authorization revoked. Password values used for authentication may be reset requiring new passwords that may be issued under controlled circumstances.

The mitigation step of process block 162 may also perform other actions. As indicated by process block 206, operating modes of the control device 16 (e.g., run state versus programming state) may be locked down to prevent pending program changes from being implemented.

Some types of mismatches may provoke instructions being sent, from the security device 31 to the control device 16 having a mismatch, where the instructions cause the control device 16 to move to a safe state and remain there. A safe state is a predetermined set of input and output values that are likely to be safe, that is to create no or minimized risk of harm to the equipment or users, and to minimize propagation of failure to other components of the control system 10. The safety states may be predetermined defined in the standard security templates 120 discussed above. Such safe states may, for example, move equipment and the like into safe positions and may deactivate certain activities.

Additional processes of the mitigation step of process block 162 may instruct the control device 16 to run the defense script 64 mentioned above which enlists the various sensors 20 and actuators 22 for defensive purpose. In one example, the defense script 64 may cause cameras associated with various control devices 16 to be activated to begin logging possibly suspicious activity in the area. Lighting control by control devices 16 may be turned on to reveal intrusions and the like and access gates intended for user safety, controlled by control devices 16, may be locked to prevent access to the equipment or devices.

As indicated by process block 209, the mitigation step of process block 162 may also instruct the activation of redundant equipment that can serve the function of the compromised control devices 16. Alternatively or in addition, the mitigation step may instruct the control devices 16 to prevent software updating or to provide local signals to operators in the area of the control device 16, for example, through human machine interface elements such as panel lights, beacons, audio annunciators, or the like.

Again each of these mitigation activities of process block 162 may be driven by a set of specifically drafted rules or more generally by the significance levels 166 determined above with respect to process block 160.

Dynamic Data

Figure 9:
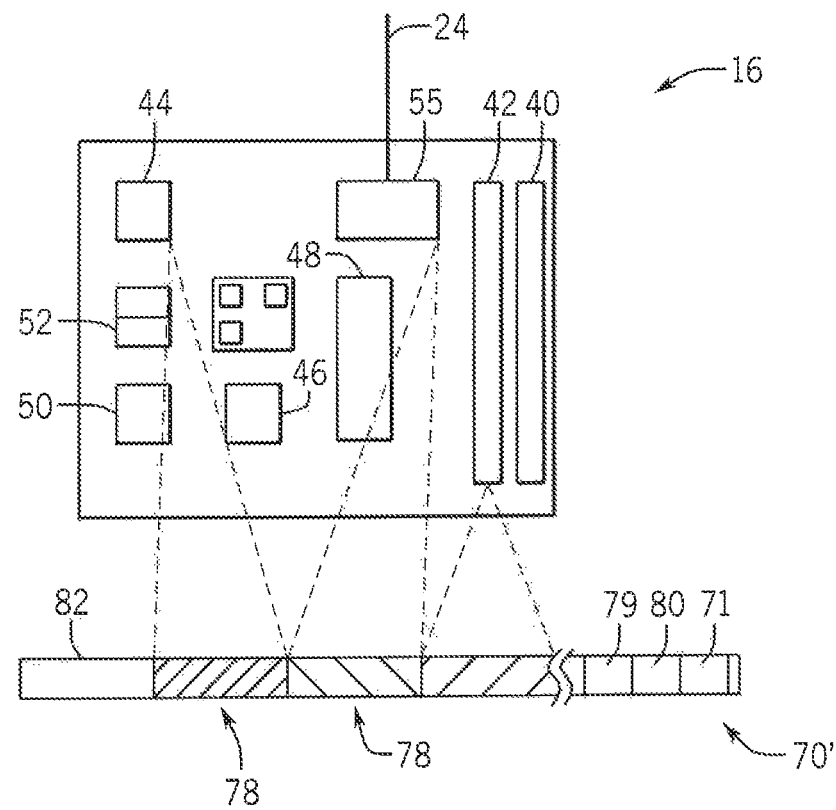
FIG. 9 is a figure similar to that of FIG. 2 showing the development of a dynamic thumbprint.

Referring, now to FIG. 9, the above description involves obtaining signatures of data that is largely "static" (that is changing slowly or changing not at all during normal operation) or "quasi-static" (that is changing but having a state characterization that is largely static), for example, a dynamic variable that nevertheless typically stays within a predefined range. It is contemplated that the present invention may be expanded to "dynamic" data, for example, current I/O data from I/O table 42 which changes rapidly with operation of the control device 16, network data from the network interface 55 including port numbers, packet counts, and the like as well as actual received packets, and processor data from the processor 44, for example, processor utilization percentage, processor fault flags and the like. Again this data may be linked with a timestamp 79, a digital signature 80, a device identification number 71, and/or a changing random code 83 to provide security in the transmission of a dynamic operating thumbprint 70'.

This dynamic operating thumbprint 70' cannot be easily compared against a static stored thumbprint but may nevertheless be compared against rules that, for example, establish ranges of values within which the operating thumbprint 70 or the underlying data should vary, or correlations between values of the underlying data that can be used to detect a deviation from the normal pattern and excursions of these dynamic values. In this case, the stored thumbprint 100 described above may be replaced by more sophisticated dynamic signatures to otherwise provide the detection of mismatches used as has been described above. Referring now to FIG. 12, one method of implementing a dynamic stored thumbprint 100' makes use of a machine learning system 201 or the like. This machine learning system 201 may be trained, as is understood in this art, using a teaching set 205 of normal dynamic operating thumbprints 70' together with an intentional corruption of those normal dynamic thumbprints 70' or intentionally manufactured thumbprints implementing hypothetical tampering scenarios. After the machine learning system 201 is trained using the teaching set 205, it then receives the actual dynamic thumbprints 70' to produce an output 203 that may be used by decision block 148 of FIG. 5.

The dynamic stored thumbprint 100' comprising either set of rules or a machine learning system may also be used for the analysis of static thumbprints 70, for example, to analyze minor evolution in the otherwise static operating state that would be expected with an industrial control system (otherwise accommodated as upgrading or the like).

At times, the rules of the dynamic stored thumbprints 100' may be allowed to evolve within certain ranges so as to eliminate false positives caused by natural evolution of the state of the control system. This evolution may be provided, for example, by using historical data to create new training sets that are used to constantly update the dynamic stored thumbprints 100'. In this case, a second level of analysis of the dynamic stored thumbprints 100' may be performed, for example, with a longer time frame, to evaluate that evolution of the dynamic stored thumbprints 100' for possible underlying problems that may be detected to trigger a response script of process block 154 described above.

The implicit rules of the dynamic stored thumbprints 100' may also be randomly perturbed at the range thresholds to change the precise thresholds at which a response script of process block 154 is invoked. This randomization can help defeat "probing" of the dynamic stored thumbprints 100', for example, on a separate industrial control system 10, where the probing is to used to collect information to defeat other industrial control systems 10. The randomization may be performed, for example, by randomly selecting among different elements of a teaching set to provide slightly different teaching rules generated by a machine learning system 201, or by randomly adjusting the thresholds of ranges of rules used to evaluate dynamic stored thumbprint 100 by minor amounts that still ensure that the function of the ranges to test for out of range conditions are still substantially met.

Referring to FIG. 10, the potentially large combinatorial space occupied by many dynamic variables can be managed in the present invention by providing a distributed security device 31 in which a mismatch per decision block 148 (of FIG. 5) is analyzed for downstream devices by the next upstream device, limiting the propagation of the dynamic thumbprints 70. To the extent that these dynamic thumbprints 70' cannot be otherwise compressed, this distribution to local analysis of the dynamic values, for example, range checking or the use of a local supervised machine learning system, may be used to convert the dynamic thumbprints 70' into static or quasi-static thumbprints 70' for conventional analysis at a security device 31 using the methods described above. The ability to accurately detect complex patterns in the data of the dynamic thumbprints 70' can be promoted by transmitting the dynamic thumbprints 70' together with context data, for example, a particular control task or local clock value related to the dynamic thumbprints 70' that allows clustering of dynamic operating thumbprint 70' into limited subsets that can be analyzed separately, for example, subsets related to temporal proximity, or subsets related to particular control tasks.

Accordingly, a dynamic operating thumbprint 70a' and a dynamic operating thumbprint 70b' generated by control devices 16a and 16b, respectively, associated with a given control task may be linked by a context established by context envelope 211 (C) encapsulating the dynamic thumbprints 70a' and 70b' and transmitted with the thumbprints 70a' and 70b'. The context envelope 211 may link the thumbprints 70a' and 70b' as relating to a common control task or similar local clock occurrences. This context envelope may be augmented as additional thumbprints 70c' are passed up to the security device 31 so that eventually a dynamic operating thumbprint 70c' with a context envelope 213 is received, this context envelope 213 collecting dynamic thumbprints 70a' and 70b' together in context envelope 211 (C) and connecting context envelope 211 (C) with operating thumbprint 70c' by context envelope 213 (E). This hierarchy of context envelope 211 and 213 allows specialized rules to be applied to each separate context minimizing the complexity of the analysis process.

A similar approach may be used with static thumbprints 70 where upstream devices 215b (e.g. a controller 12) may aggregate static state thumbprints 70 from downstream devices 215a (e.g. 16) with the upstream devices 215b generating its own static thumbprints 70 being a digest of the received thumbprints 70 from the downstream devices 215a. These new static thumbprints 70 are then forwarded further upstream to further upstream devices 215c and this process may be repeated. Preliminary matching of the thumbprint 72 to stored thumbprints 100 may occur at intermediary upstream devices 215b with only the results of those matches (per decision block 148 of FIG. 5) being sent upstream to devices 215e with the provision that in the event of a mismatch or at any time, a higher-level security device 31 may request that the raw received thumbprints 70 may be passed through the intermediary devices 215b and 215c without digesting for analysis at a higher-level. This latter procedure helps prevent tampering with the security mechanism through attacks at intermediary devices 215h and 215c.

Safety Monitoring

The above description has been provided in a context of monitoring an industrial control system against malicious attacks. It will be appreciated that elements of the above system can also be used to detect irregularities in the operation of an industrial control system that do not necessarily result from malicious intent but that may nevertheless affect the integrity or safety of operation of the industrial control system.

"Safety" as used herein refers to the operation of specialized industrial control systems ("safety systems") used in environments where the safety of humans requires proper functioning of the control system. Safety systems may include the electronics associated with emergency-stop buttons, light curtains, and other machine lockouts. Traditionally, safety systems have been implemented by a set of redundant circuits separate from the industrial control system used to control the industrial process with which the safety system is associated. Such safety systems were "hard-wired" from switches and relays including specialized "safety relays" which provide comparison of redundant signals and internal checking of fault conditions such as welded or stuck contacts.

Current safety systems may be implemented using specialized computer hardware and network protocols for example as taught by U.S. Pat. Nos. 6,631,476; 6,701,198; 6,721,900; 6,891,850; and 6,909,923 all hereby incorporated by reference. U.S. Pat. No. 7,027,880, also hereby incorporated by reference and assigned to the assignees of the present invention, describes a safety system that uses a "signature" of the software executed by the safety system that can be compared to a signature of a previously certified version of the same software. This comparison process allows rapid recertification (or determination of proper certification) of the safety system. The present invention may expand upon this concept by using the security signatures described above as safety signatures that provide a complete indication of changes in the industrial control system beyond merely changes in the operating software to also include changes in configuration data and environmental data which together a define control state of the industrial controller. In addition or alternatively, the aggregation of safety signatures from multiple elements of the control device allows for more comprehensive assurance of the integrity of a safety system comprised of multiple elements. As is also described above, the safety system may provide for diagnostics not normally present with safety systems by zeroing in on the cause of the fault to help correct this fault. This zeroing in is accomplished by obtaining increasingly detailed safety signatures in the manner discussed above.

A failure of the safety signal from any element to match a corresponding stored signature associated with a safety certified state of the industrial control system may cause the system to send alerts to the appropriate personnel in the manner discussed above and also to move the system to a safe state as is also discussed above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller", "an industrial controller", and "a computer", should be understood to include any general computing device suitable for the recited function including workstations, industrial controllers, personal or desktop computers, servers, cloud, computers and the like operating locally or remotely to other elements of the invention.

References to "a microprocessor" and "a processor" or "the microprocessor" and "the processor," should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

The term "network port" should not be construed as limited to particular types of networks or ports but is intended to broadly cover communications via wired and wireless ports, ports connecting to separate media such as cables and optical fibers as well as backplanes, and a variety of protocols including but not limited to RS-232/422, USB, IEEE1394, and 1756-EN2T protocols.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. An industrial control device for use in an industrial control system providing coordinated control of multiple industrial control devices according to a control program, the industrial control device comprising:
   a network port for communicating with other elements of the industrial control system;
   electrical connectors for accepting electrical conductors communicating with industrial equipment to receive or transmit electrical signals from or to that industrial equipment for the control of an industrial process;
   at least one processor communicating with the network port and electrical connectors; and
   an electronic memory system accessible by the processor and holding data sources comprising: operating software describing operation of the control device and executable by the processor, configuration data defining a configuration of the control device, and environmental data describing an operating environment of the control device, wherein the environmental data includes wire connection states of the electrical connectors, a spatial location of the control device or a temperature of the control device, wherein the operating software, configuration data, and environmental data together form a data set operable to define a control device state;
   wherein the operating software is executable by the processor to:
   (a) read at least a portion of the control device state to generate a state thumbprint of the control device state using a lossy compression system;
   (b) encrypt the state thumbprint;
   (c) transmit the encrypted state thumbprint over the network port to the industrial control system, wherein the encrypted state thumbprint is used to detect tampering with the industrial control system; and
   (d) perform a mitigation action in response to a detected tampering with the industrial control system.

2. The industrial control device of claim 1 wherein the operating software is further executable by the processor to append at least one of a timestamp and sequence number to the state thumbprint, the timestamp and sequence number indicating, respectively, a time of transmission of the state thumbprint and a sequence of transmission of the state thumbprint over the network port.

3. The industrial control device of claim 1 wherein the state thumbprint provides a compressed representation of the operating software adapted to reveal modification of the operating software when compared with a benchmark state thumbprint.

4. The industrial control device of claim 3 wherein the operating software includes a revision number.

5. The industrial control device of claim 3 wherein the operating software includes a control program and at least one of a security and safety monitoring program.

6. The industrial control device of claim 1 wherein the state thumbprint provides a compressed representation of the configuration data of the control device.

7. The industrial control device of claim 1 wherein the configuration data is selected from the group consisting of a serial number of the control device, a functional type of the control device, a manufacturer of the control device and a date of manufacture of a control device.

8. The industrial control device of claim 6 wherein the state thumbprint provides a compressed representation of the configuration data including an encrypted certification code indicating authenticity of hardware of the control device.

9. The industrial control device of claim 6 wherein the state thumbprint provides a compressed representation of configuration data representing an output of a diagnostic program being part of the operating program.

10. The industrial control device of claim 1 wherein the state thumbprint provides a compressed representation of the environmental data and wherein the environmental data is data selected from the group consisting of the spatial location of the control device and the temperature of the control device.

11. The industrial control device of claim 1 wherein the generation of the state thumbprint reads multiple portions of the control device state and independently compresses those portions using the lossy compression system and concatenates the independently compressed portions to produce the state thumbprint.

12. The industrial control device of claim 11 wherein the operating software responds to instructions received over the network port to change at least one of a number of the multiple portions and particular portions of the control device state contained in the multiple portions according to those instructions.

13. The industrial control device of claim 1 wherein the operating software responds to instructions received over the network port to transmit the state thumbprint.

14. The industrial control device of claim 1 wherein the operating software provides program instructions for operating the control device as at least one of an I/O module providing an interface for communication with two state electrical actuators using a digital signal, an I/O module providing an interface for communications with multi-state actuators and sensors using an analog signal; and a motor drive for synthesizing voltage waveforms for controlling a motor.

15. The industrial control device of claim 1 wherein the electronic memory includes multiple memory subsystem selected from the group consisting of: volatile memory, nonvolatile memory, input output registers, and program memory.

16. An industrial control system comprising:
I. multiple intercommunicating control devices each providing:
(a) a network port for communicating with other control devices of the industrial control system;
(b) electrical connectors for accepting electrical conductors communicating with industrial equipment to receive or transmit electrical signals from or to that industrial equipment for the control of an industrial process;
(c) at least one processor communicating with the network port and electrical connectors; and
(d) an electronic memory system accessible by the processor and holding data sources comprising: operating software describing operation of the control device, configuration data defining a configuration of the control device, and environmental data defining an operating environment of the control device, wherein the environmental data includes wire connection states of the electrical connectors, a spatial location of the control device or a temperature of the control device, wherein the operating software, configuration data, and environmental data together forming a data set defining a control device state;
wherein the operating software is executable by the processor to:
(i) read at least a portion of the control device state to generate a state thumbprint of the control device state using a lossy compression system;
(ii) encrypt the state thumbprint; and
(iii) transmit the state thumbprint over the network port;
II. a state monitor providing:
(a) a network port for communicating with control devices;
(b) at least one processor communicating with the network port;
(c) an electronic memory system accessible by the processor and holding: a state-monitoring program and at least one benchmark state thumbprint representing a state thumbprint of a properly operating control device identified to a control device;
wherein the state-monitoring program is executable by the processor to:
(i) receive a state thumbprint from a given control device through the network port and decrypt the state thumbprint;
(ii) identify a benchmark state thumbprint corresponding to the given control device;
(iii) compare the received state thumbprint to the corresponding benchmark state thumbprint;
(iv) provide an output indicating whether the received state thumbprint matches the corresponding benchmark state thumbprint, wherein the output is used to detect tampering with the industrial control system; and
(v) perform a mitigation action in response to a detected tampering with the industrial control system.

17. The industrial control system of claim 16 wherein the state-monitoring program further outputs an indication when a state thumbprint is not received within a predetermined time period.

18. The industrial control system of claim 16 wherein the state-monitoring program transmits over the network port to a control device's request for state thumbprints at periodic request times and wherein the time period is based on a last periodic request time.

19. A method of establishing an integrity of an industrial control system including multiple control devices and at least one integrity monitoring device comprising the steps of:
at each given control device:
(a) read at least a portion of a control device state to generate a state thumbprint of the control device state using a lossy compression system, wherein the control device state is defined by a data set comprising a plurality of data sources including: operating software describing operation of the control device and executable by a processor; configuration data defining a configuration of the control device, and environmental data defining operating environment of the control device, wherein the environmental data includes wire connection states of the electrical connectors, a spatial location of the control device or a temperature of the control device;

(b) encrypt the state thumbprint; and (c) transmit the encrypted state thumbprint over a network port to the industrial control system; and at the integrity monitoring device:

(a) receive encrypted state thumbprints from each given control device and decrypt the state thumbprints;

(b) for each given control device, identify a benchmark state thumbprint stored at the integrity monitoring device and associated with the given control device;

(c) compare the received state thumbprints to the corresponding benchmark state thumbprints;

(d) provide an output indicating whether the received state thumbprints match the corresponding benchmark state thumbprints, wherein the output is used to detect tampering with the industrial control system; and (e) perform a mitigation action in response to a detected tampering with the industrial control system.

* * * * *